(12) United States Patent
Ahn et al.

(10) Patent No.: US 10,096,301 B2
(45) Date of Patent: Oct. 9, 2018

(54) METHOD FOR CONTROLLING FUNCTION AND ELECTRONIC DEVICE THEREOF

(71) Applicant: Samsung Electronics Co., Ltd., Gyeonggi-do (KR)

(72) Inventors: Jin-Ho Ahn, Gyeonggi-do (KR); Chan-Woo Park, Gyeonggi-do (KR); Yoo-Kyung Koh, Gyeonggi-do (KR); Joo Namkung, Gyeonggi-do (KR); Man-Su Han, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 1 day.

(21) Appl. No.: 14/737,064

(22) Filed: Jun. 11, 2015

(65) Prior Publication Data
US 2015/0364113 A1    Dec. 17, 2015

(30) Foreign Application Priority Data
Jun. 11, 2014  (KR) ........................ 10-2014-0070790

(51) Int. Cl.
*G09G 5/12* (2006.01)
*G06F 3/01* (2006.01)
*G02B 27/01* (2006.01)
*G06F 1/16* (2006.01)

(52) U.S. Cl.
CPC ........... *G09G 5/12* (2013.01); *G02B 27/0172* (2013.01); *G06F 1/1632* (2013.01); *G06F 1/1647* (2013.01); *G06F 3/012* (2013.01); *G06F 3/013* (2013.01); *G06F 3/017* (2013.01); *G09G 2354/00* (2013.01); *G09G 2370/06* (2013.01); *G09G 2370/22* (2013.01)

(58) Field of Classification Search
CPC .. G02B 27/017; G02B 27/0172; G06T 19/006
See application file for complete search history.

(56) References Cited

U.S. PATENT DOCUMENTS

| | | | |
|---|---|---|---|
| 2010/0079356 A1* | 4/2010 | Hoellwarth | G02B 27/017 345/8 |
| 2013/0050069 A1 | 2/2013 | Ota | |
| 2013/0163090 A1* | 6/2013 | Yu | G06F 3/011 359/630 |
| 2013/0229653 A1* | 9/2013 | Tatsuta | G02B 27/0905 356/328 |
| 2014/0104692 A1* | 4/2014 | Bickerstaff | G02B 27/017 359/630 |

FOREIGN PATENT DOCUMENTS

| | | |
|---|---|---|
| JP | 2010146481 | 7/2010 |
| KR | 1020130062522 | 6/2013 |

OTHER PUBLICATIONS

European Search Report dated Nov. 17, 2015 issued in counterpart application No. 15171668.5-1972, 8 pages.
European Search Report dated Jun. 29, 2018 issued in counterpart application No. 15171668.5-1216, 6 pages.

* cited by examiner

*Primary Examiner* — Michael Faragalla
*Assistant Examiner* — Chayce Bibbee
(74) *Attorney, Agent, or Firm* — The Farrell Law Firm, P.C.

(57) ABSTRACT

A method for operating an electronic device is provided. The method includes connecting to a Head Mounted Device (HMD), receiving an input through the HMD while the HMD is connected, and in response to the received input, performing a function corresponding to the received input.

17 Claims, 13 Drawing Sheets

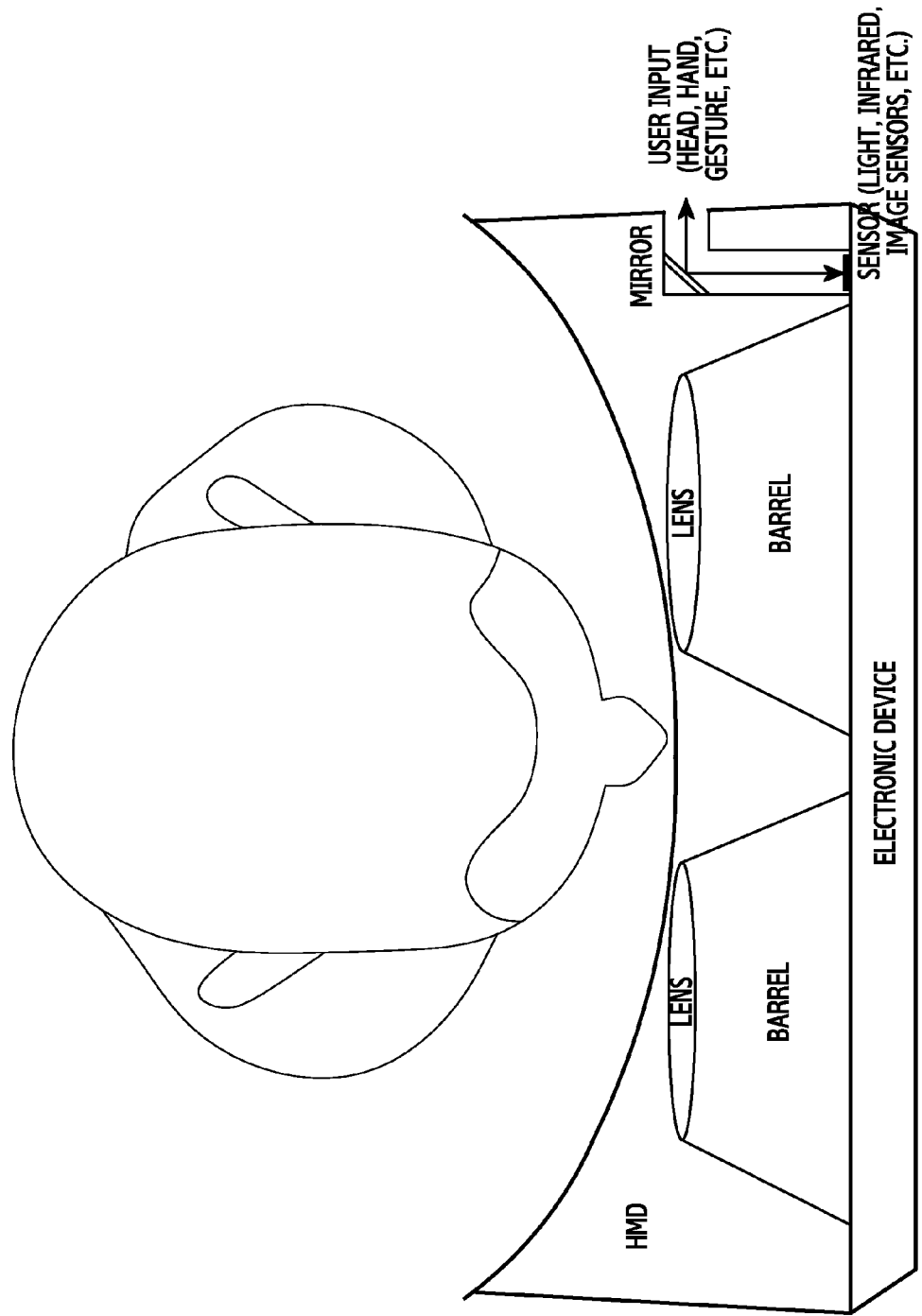

METHOD FOR CONTROLLING FUNCTION AND ELECTRONIC DEVICE THEREOF

PRIORITY

This application claims priority under 35 U.S.C. § 119(a) to a Korean Patent Application filed in the Korean Intellectual Property Office on Jun. 11, 2014, and assigned Serial No. 10-2014-0070790, the entire content of which is incorporated herein by reference.

BACKGROUND

1. Field of the Disclosure

The present disclosure relates generally to a function controlling method and an electronic device thereof.

2. Description of the Related Art

With advances in information communication technologies and semiconductor technologies, various electronic devices are evolving into multimedia devices for providing various multimedia services. For example, the electronic device can provide various multimedia services such as a messenger service, a broadcasting service, a wireless Internet service, a camera service, and a music play service.

Such electronic devices are getting slimmer and developing into a body-fitted electronic device (e.g., a Head Mounted Device (HMD)) with good portability. For example, the HMD can be put on the head or coupled with the electronic device such as a portable terminal. The HMD can act as a standalone product by deploying a display and an operating system.

When the electronic device is coupled with the HMD, the HMD can include a touchpad and a physical key button. Using the touchpad and the physical key button, a user can control the electronic device or the HMD. However, using the touchpad and the key button included in the HMD, the user wearing the HMD cannot see the object ahead. As a result, the practical use of the touchpad and the key button is seriously degraded. Also, every press of the touchpad and the key pad causes slight movement. In addition, when the user wearing the HMD moves, the generated movement differs from movement of a screen displayed to the user, thus may cause the user to feel dizzy.

SUMMARY

The present disclosure has been made to solve at least the above-mentioned problems and/or disadvantages and to provide at least the advantages described below. Accordingly, an aspect of the present disclosure is to provide a function controlling method and an electronic device for reducing vibration according to a user input and enhancing usability of the HMD in a particular situation when the HMD is worn.

Another aspect of the present disclosure is to provide a function controlling method and an electronic device for executing a function corresponding to a user input with an HMD.

Another aspect of the present disclosure is to provide a function controlling method and an electronic device for intuitively controlling the device without pressing a control button with an HMD.

Another aspect of the present disclosure is to provide a function controlling method and an electronic device for tracking a position by recognizing at least one of a marker and an external environment without a separate additional module.

Another aspect of the present disclosure is to provide a function controlling method and an electronic device for preventing dizziness of a user in movement when an HMD is used, and efficiently using a battery power of the HMD.

According to an aspect of the present disclosure, a method for operating an electronic device is provided, which includes connecting to an HMD; receiving an input through the HMD while the HMD is connected; and performing a function corresponding to the input.

According to another aspect of the present disclosure, an electronic device is provided, which includes a connector configured to connect to an HMD and to receive an input through the HMD while the HMD is connected; and a processor configured to perform a function corresponding to the input.

According to another aspect of the present disclosure, a mounted device is provided, which includes a docking portion configured to couple with an electronic device; an optical portion configured to optically adjust a display screen of the electronic device coupled to the docking portion and to show the adjusted display screen; and a reflector configured to lead an input so that a sensor of the electronic device coupled to the docking portion receives the input.

According to another aspect of the present disclosure, a method for operating a mounted device is provided, which includes coupling with an electronic device; and leading an input so that the coupled electronic device receives the input.

BRIEF DESCRIPTION OF THE DRAWINGS

The above and other aspects, features, and advantages of certain embodiments of the present disclosure will be more apparent from the following description, taken in conjunction with the accompanying drawings, in which:

FIG. 6A illustrates an example of a mirror disposed in an HMD according to an embodiment of the present disclosure;

Throughout the drawings, like reference numerals will be understood to refer to like parts, components and structures.

DETAILED DESCRIPTION

Figure 1:
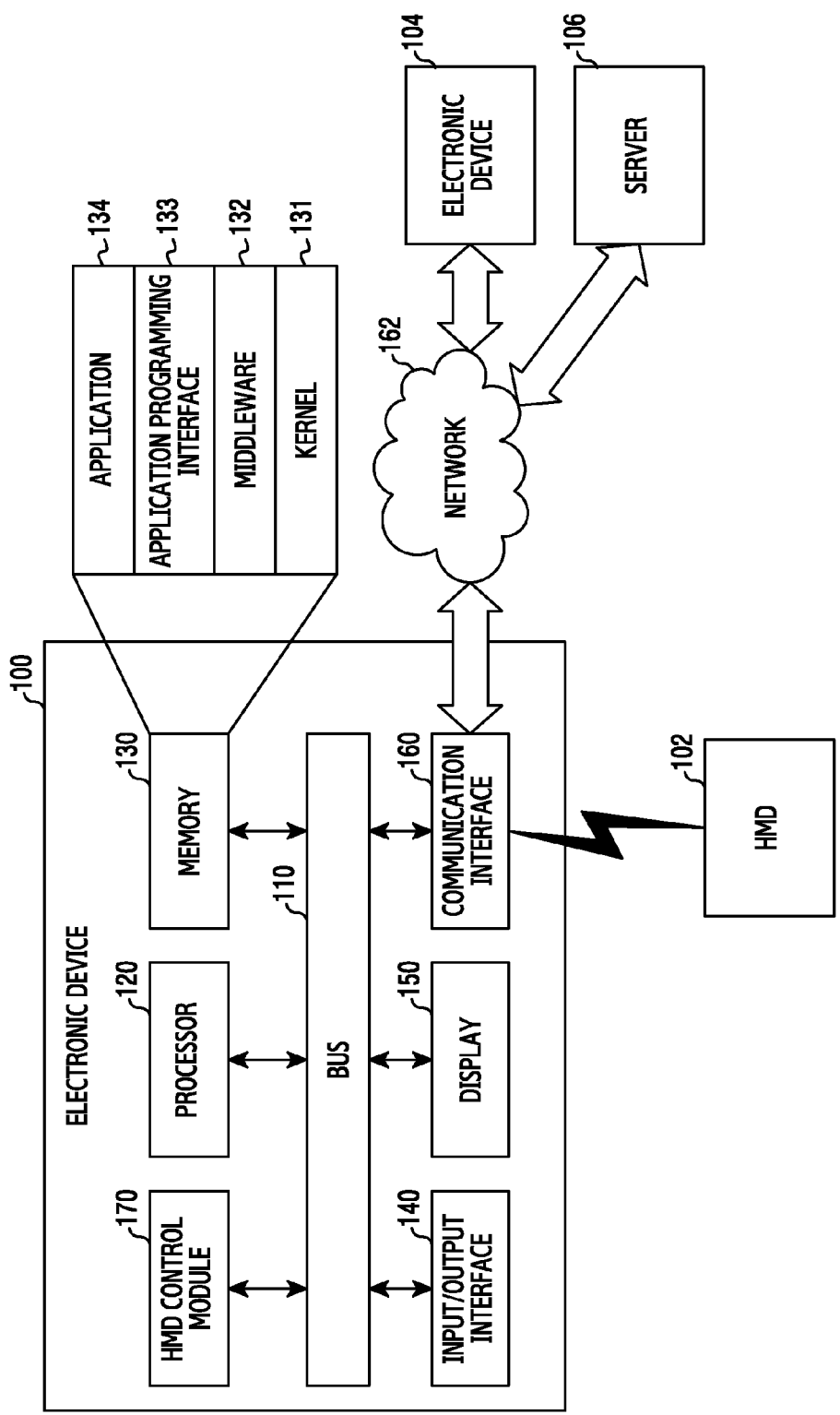
FIG. 1 illustrates a system including an electronic device according to an embodiment of the present disclosure.

The following description with reference to the accompanying drawings is provided to assist in a comprehensive understanding of embodiments of the disclosure as defined by the claims and their equivalents. It includes various specific details to assist in that understanding but these are to be regarded merely as examples. Accordingly, those of ordinary skill in the art will recognize that various changes and modifications of the embodiments described herein can be made without departing from the scope and spirit of the present disclosure. In addition, descriptions of well-known functions and constructions may be omitted for clarity and conciseness.

As used in the present disclosure, terms such as "includes" or "may include" refer to the presence of the corresponding function, operation or feature, and do not limit the presence of additional functions, operations or features. Also, terms such as "includes" or "has" refer to the presence of characteristics, numbers, operations, operations, components or combinations thereof, and is not intended to exclude one or more additional characteristics, numbers, operations, operations, components or combinations thereof.

As used in the present disclosure, the term "or" is used to include any and all combination of terms listed. For examples, "A or B" includes only A, only B, or both A and B.

As used in the present disclosure, terms such as "first" or "second" may be used to describe various features, but do not limit such features. For example, the terms do not limit the order and/or the importance of their associated features. Such terms may be used to differentiate one feature from another. For example, a first user equipment (UE) and a second user equipment are both user equipment, but are different user equipment. For example, without departing from the scope of the present disclosure, a first component may be referred to as a second component, and likewise, a second component may be referred to as a first component.

If a component is said to be "connected with" or "connected to" another component, the component may be directly connected with, or connected to, the other component, or another component may exist in between. On the other hand, if a component is said to be "directly connected with" or "directly connected to" another component, it should be understood that no components exist in between.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The term "module" used in an embodiment of the present disclosure indicates, for example, a unit including a combination of one or more of hardware, software, or firmware. The term "module" may be interchangeably used with the terms, for example, "unit," "logic," "logical block," "component," or "circuit." The "module" may be a minimum unit or part of the components integrally formed. The "module" may be a minimum unit or part of one or more functions. The "module" may be implemented mechanically or electronically. For example, the "module" may include at least one of an Application-Specific Integrated Circuit (ASIC), a Field-Programmable Gate Array (FPGA), or a programmable-logic device for performing operations which are well known or will be developed.

Unless defined otherwise, all terms used herein have the same meaning as commonly understood by those of skill in the art. Such terms as those defined in a generally used dictionary are to be interpreted to have the same meanings as the contextual meanings in the relevant field of art, and are not to be interpreted to have ideal or excessively formal meanings unless clearly defined in the present specification.

An electronic device according to various embodiments of the present disclosure can be a device including communication functionality. For example, the electronic device can include at least one of a smartphone, a tablet Personal Computer (PC), a mobile phone, a video phone, an e-book reader, a desktop PC, a laptop PC, a netbook computer, a Personal Digital Assistant (PDA), a Portable Multimedia Player (PMP), a Moving Picture Experts Group Audio Layer 3 (MP3) player, a mobile medical appliance, a camera, and a wearable device (e.g., a Head Mounted Device (HMD) such as electronic glasses, electronic textiles, an electronic bracelet, an electronic necklace, an electronic appcessory, an electronic tattoo, and a smart watch).

According to various embodiments of the present disclosure, an electronic device can be a smart home appliance having the communication functionality. The smart home appliance can include, for example, at least one of a television, a Digital Video Disk (DVD) player, an audio system, a refrigerator, an air conditioner, a vacuum cleaner, an oven, a microwave oven, a washing machine, an air purifier, a set-top box, a TV box (e.g., Samsung HomeSync™, AppleTV™, or Google TV™), game consoles, an electronic dictionary, a digital key, a camcorder, and a digital frame.

According to various embodiments of the present disclosure, an electronic device can include at least one of various medical appliances (e.g., Magnetic Resonance Angiography (MRA), Magnetic Resonance Imaging (MRI), Computed Tomography (CT), X-ray system, ultrasonicator)), a navigation device, a Global Positioning System (GPS) receiver, an Event Data Recorder (EDR), a Flight Data Recorder (FDR), an in-vehicle information device, marine electronic equipment (e.g., marine navigation device and gyro compass), an avionic system, a security device, and an industrial or home robot.

According to various embodiments of the present disclosure, an electronic device can include at least one of part of furniture or building/structure having the communication functionality, an electronic board, an electronic signature receiving device, a projector, and various gauges (e.g., gauges for water, electricity, gas, and radio waves).

An electronic device according to various embodiments of the present disclosure can be one or a combination of those various devices. The electronic device can be a flexible device. Also, those skilled in the art should understand that the electronic device is not limited to those devices.

Hereinafter, embodiments of the present disclosure provide an electronic device by referring to the attached drawings. The term 'user' used in embodiments of the present disclosure can represent a person or a device (e.g., an artificial intelligent electronic device) who or which uses the electronic device.

According to various embodiments of the present disclosure, the electronic device can be mounted to or detached from a Head Mounted Device (HMD). For example, the electronic device can have a shape corresponding to, but not limited to, a shape of the HMD. The electronic device can function while contacting at least part of the HMD.

FIG. 1 is a block diagram of a system including an electronic device according to an embodiment of the present disclosure.

Referring to FIG. 1, the electronic device 100 includes a bus 110, a processor 120, a memory 130, an input/output interface 140, a display 150, a communication interface 160, and an HMD control module 170. The HMD control module 170 can be included in the processor 120 or in a separate module in association with the processor 120. Hereinafter, the HMD control module 170 is described as being included in the processor 120.

The bus 110 interlinks the components (e.g., the processor 120, the memory 130, the input/output interface 140, the display 150, the communication interface 160, and the HMD control module 170) of the electronic device 100 and controls communications between the components.

The processor 120 receives an instruction from the components (e.g., the memory 130, the input/output interface 140, the display 150, the communication interface 160, and the HMD control module 170) of the electronic device 100 via the bus 110, interprets the received instruction, and performs an operation or processes data according to the interpreted instruction. The processor 120 controls to execute at least one program stored in the memory 130 and to provide a service corresponding to the program.

The processor 120 recognizes at least one of a marker and an external environment using a sensor or a camera. For example, the processor 120 may capture an Infrared Marker (IM) using an infrared camera installed in one side of the electronic device 100. The processor 120 obtains marker information (e.g., an image signal) based on the captured IM and provides the obtained marker information to an HMD 102. The processor 120 obtains position and posture information of an object by tracking and analyzing a position and a posture of the IM with respect to the infrared camera in real time, analyzes a position and a type of the IM based on the obtained position and posture information of the object, and displays an image corresponding to the position and the type of the marker on a screen. Here, the posture indicates an angle and a direction, and includes angle and direction information of the IM, which is captured by the infrared camera, in relation to the infrared camera. The processor 120 captures not only the IM but also a tracking marker or a distance marker and thus tracks the position based on the captured marker information.

The processor 120 recognizes the external environment through the sensor of the electronic device 100. For example, the processor 120 may obtain depth information based on a distance to an external object through an image sensor installed in a front side or a back side of the electronic device 100. The processor 120 analyzes the obtained depth information, displays a corresponding image on the screen, and provides the obtained depth information to the HMD 102.

The processor 120 being connected to the HMD 102 controls to perform corresponding to the obtained user input using the sensor. For example, the processor 120 may detect a head gesture, a hand gesture, and a pupil movement of the user using at least one of an image sensor, an iris sensor, an infrared sensor, and a light sensor. The processor 120 controls a current content based on the user input. The processor 120 performs a function associated with a current application based on the user input. The processor 120 controls a current screen based on the user input. The processor 120 controls the connected HMD 102 based on the user input.

The processor 120 may include one or more Application Processors (APs) or one or more Communication Processors (CPs). For example, the AP and the CP may be included in the processor 120 or in different Integrated Circuit (IC) packages respectively. The AP and the CP may be included in a single IC package.

The AP controls hardware or software components connected to the AP by driving an operating system or an application program, and processes various data including multimedia data and operations. For example, the AP may be implemented using, for example, a System on Chip (SoC).

The CP performs at least part of a multimedia control function. The CP identifies and authenticates a device in a communication network using a Subscriber Identity Module (SIM) card. In so doing, the CP provides a user with services including voice telephony, video telephony, text message, and packet data. The CP controls data transmission and reception of the communication interface 160.

The AP or the CP loads and processes an instruction or data received from its non-volatile memory or at least one of the other components, in a volatile memory. The AP or the CP stores data received from or generated by at least one of the other components, in the non-volatile memory.

The CP manages data links and converts a communication protocol in a communication between the electronic device including hardware and other electronic devices connected over the network. The CP may be implemented using an SoC.

The processor 120 may include one or more data processors, an image processor, and a codec. The electronic device 100 may separately include a data processor, an image processor, or a codec. The processor 120 may further include a Graphics Processing Unit (GPU).

The memory 130 stores the instruction or the data received from or generated by one or more components (e.g., the processor 120, the input/output interface 140, the display 150, the communication interface 160, and the HMD control module 170) of the electronic device 100.

The memory 130 stores one or more programs for the service of the electronic device 100. For example, the memory 130 may include a kernel 131, a middleware 132, an Application Programming Interface (API) 133, and an application 134. The program may be implemented using a program module, and the programming module may be implemented using software, firmware, and hardware, or a combination of at least two of them.

The kernel 131 controls or manages system resources (e.g., the bus 110, the processor 120, and the memory 130) used to execute operations or functions of the other programming modules (e.g., the middleware 132, the API 133, or the application 134). Also, the kernel 131 provides an interface allowing the middleware 132, the API 133, or the application 134 to access, control or manage the individual components of the electronic device 100.

The middleware 132 relays data between the API 133 or the application 134 and the kernel 131. The middleware 132 load-balances task requests received from at least one application by giving priority of the system resource (e.g., the bus 110, the processor 120, or the memory 130) of the electronic device 100 to the task requests.

The API 133, which is an interface for the application 134 to control a function provided from the kernel 131 or the middleware 132, may include at least one interface or function (e.g., instruction) for file control, window control, image processing, or text control.

The application 134 may include a Short Message Service (SMS)/Multimedia Messaging Service (MMS) application, an e-mail application, a calendar application, an alarm application, a health care application (e.g., an application for measuring an amount of exercise, a blood sugar level, and/or the like), or an environmental information application (e.g., an application for providing air pressure, humidity, temperature information, and/or the like). Alternatively, the application 134 may be involved in information exchange between the electronic device 100 and an external electronic device (e.g., an electronic device 104 or the HMD 102). The information exchange application may include, for example, a notification relay application for relaying certain information to an external electronic device or a device management application for managing the external electronic device.

For example, the notification relay application may relay the notification information of another application (e.g., an SMS/MMS application, an e-mail application, a health care application, an environmental information application, and/or the like) of the electronic device 100 to the external electronic device 104 or the HMD 102. Alternatively, the notification relay application may receive and provide the notification information from the external electronic device (104 or the HMD 102 to the user. The device management application turns on/off at least part of the function (e.g., the external electronic device (or some other components)) of the external electronic device 104 or the HMD 102 communicating with the electronic device 100, control brightness (or resolution) of the display, and manages (e.g., install, delete, or update) the service (e.g., a call service or a messaging service) provided by an application of the external electronic device or by the external electronic device itself.

The application 134 may include an application designated based on an attribute (e.g., a type of the electronic device) of the external electronic device 104 or the HMD 102. For example, when the external electronic device is an MP3 player, the application 134 may include a music playing application. Similarly, when the external electronic device is a mobile medical device, the application 134 may include a health care application. The application 134 may include at least one of the application designated in the electronic device 100 and the application received from a server 106, the electronic device 104, or the HMD 102.

The memory 130 may include an internal memory or an external memory. The internal memory may include at least one of, for example, volatile memory (e.g., Dynamic RAM (DRAM), Static RAM (SRAM), Synchronous Dynamic RAM (SDRAM)) or non-volatile memory (e.g., One-Time Programmable Read Only Memory (ROM) (OTPROM), Programmable ROM (PROM), Erasable and Programmable ROM (EPROM), Electrically Erasable and Programmable ROM (EEPROM), mask ROM, flash ROM, NAND flash memory, NOR flash memory). The internal memory may employ a Solid State Drive (SSD).

The external memory may include at least one of a Compact Flash (CF) memory card, a Secure Digital (SD) memory card, a Micro-SD memory card, a Mini-SD memory card, an extreme digital (xD) memory card, or a memory stick.

The input/output interface 140 forwards an instruction or data input from the user through an input/output device (e.g., a sensor, a keyboard, or a touch screen) to, for example, the processor 120, the memory 130, the communication interface 160, or the HMD control module 170 via the bus 110. For example, the input/output interface 140 may forward data of the user's touch input through the touch screen, to the processor 120. For example, the input/output interface 140 may output an instruction or data received from the processor 120, the memory 130, the communication interface 160, or the MHD control module 170 via the bus 110, through an input/output device (e.g., a speaker or a display). For example, the input/output interface 140 may output voice data processed by the processor 120 to the user through the speaker.

The display 150 displays various information (e.g., multimedia data or text data) to the user.

The communication interface 160 establishes the communication between the electronic device 100 and the external device 104, the server 106, or the HMD 102. For example, the communication interface 160 may communicate with the external device over the network 162 using wireless communication or wired communication. The wireless communication may include at least one of, for example, Wireless Fidelity (WiFi), Bluetooth (BT), Near Field Communication (NFC), GPS, and cellular communication (e.g., Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), or Global System for Mobile Communications (GSM)). The wired communication may include at least one of, for example, a Universal Serial Bus (USB), a High Definition Multimedia Interface (HDMI), a Recommended Standard (RS) 232, a Plain Old Telephone Service (POTS), and/or the like.

The network 162 may be the communication network. The communication network may include at least one of a computer network, the Internet, the Internet of things, and a telephone network. The protocol (e.g., transport layer protocol, data link protocol, or physical layer protocol) for the communication between the electronic device 100 and the external device may be supported by at least one of the application 134, the API 133, the middleware 132, the kernel 131, and the communication interface 160.

The electronic device 100 may further include a sensor module. The sensor module may include at least one of a gesture sensor, a gyro sensor, an atmospheric pressure sensor, a magnetic sensor, an acceleration sensor, a grip sensor, a proximity sensor, an image color sensor, a biometric sensor, a temperature sensor, a humidity sensor, a light sensor, and an Ultra Violet (UV) light sensor.

The sensor module measures a physical quantity or detects an operation status of the electronic device 100, and converts the measured or detected information to an electric signal. For example, the sensor module may include an Electronic Nose (E-nose) sensor, an Electro Myo Graphy (EMG) sensor, an Electro Encephalo Gram (EEG) sensor, or an Electro Cardio Gram (ECG) sensor.

The names of the components of the electronic device 100 may differ according to the type of the electronic device. The electronic device 100 may include one or more of the components, omit some components, or further include other components according to its type.

Figure 2:
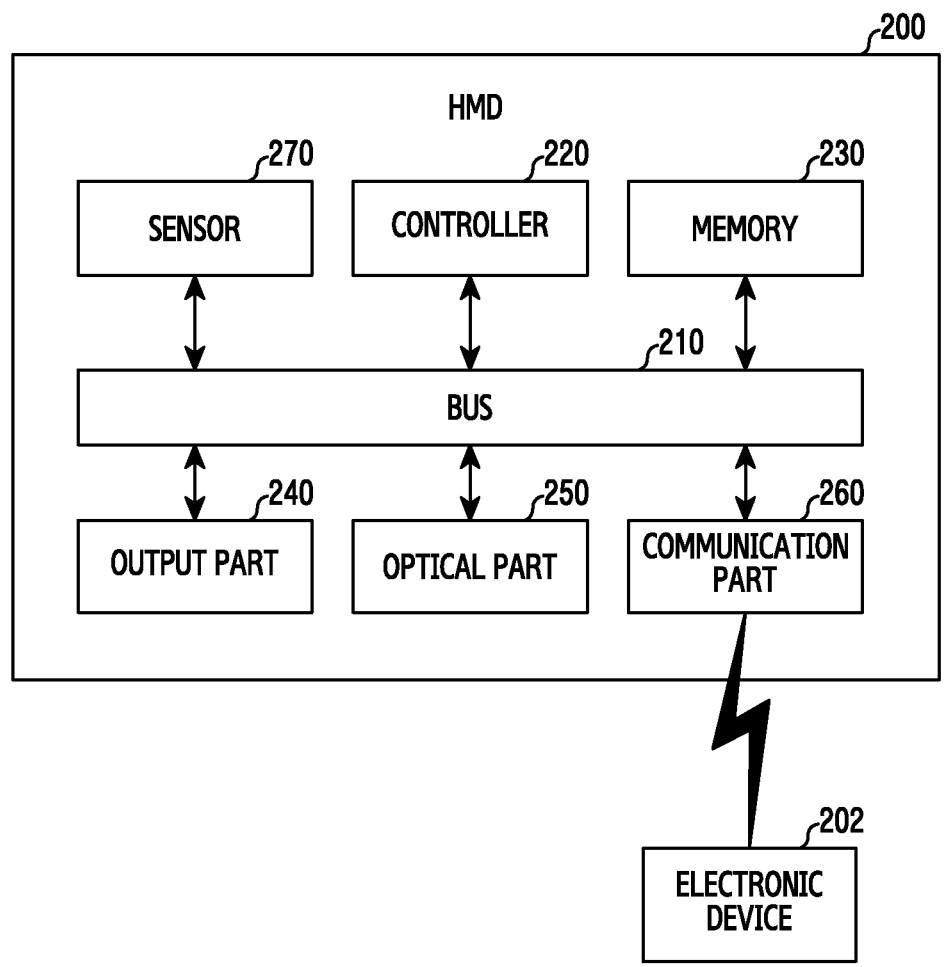
FIG. 2 illustrates a configuration of a Head Mounted Device (HMD) according to an embodiment of the present disclosure.

FIG. 2 is a block diagram of an HMD according to an embodiment of the present disclosure.

Referring to FIG. 2, the HMD 200 includes a bus 210, a controller 220, a memory 230, an output part 240, an optical part 250, a communication part 260, and a sensor 270. The HMD 200 is wire or wirelessly connected to an electronic device 202 through the communication part 260 and associated with the electronic device 202.

The bus 210 interlinks the components (e.g., the controller 220, the memory 230, the output part 240, the optical part 250, the communication part 260, and the sensor 270) of the HMD 200 and controls communications between the components.

The controller 220 receives an instruction from the components (e.g., the memory 230, the output part 240, the optical part 250, the communication part 260, and the sensor 270) of the HMD 200 via the bus 210, interprets the received instruction, and performs an operation or processes data according to the interpreted instruction. The controller 220 controls to execute at least one program stored in the memory 230 and to provide a service corresponding to the program.

When the HMD 200 is connected to the electronic device 202, the controller 220 shows a display screen of the electronic device 202 adjusted through the optical part 250, to the user. For example, the controller 220 may divide the display screen of the connected electronic device 202 into two regions and display the regions in two dimensions or three dimensions. The controller 220 provides the user with an augmented reality or a virtual reality through the optical part 250. The controller 220 tracks the position based on head tracking information of the user provided from the sensor 270. For example, the controller 220 may control the optical part 250 according to the head tracking information and thus show the adjusted display screen of the electronic device 202 to the user.

The controller 220 tracks the position by receiving at least one of the marker information or the external environment information from the electronic device 202. For example, the controller 220 may obtain the position and posture information of the object by tracking and analyzing the position and the posture of the marker in real time based on the received marker information (e.g., the image signal), and control the optical part 250 according to the position and the type of the marker based on the obtained position and posture information of the object.

The controller 220 receives the external environment information obtained through the sensor, from the electronic device 202. For example, the controller 220 may analyze a distance to the external object based on the received external environment information (e.g., the depth information) and control the optical part 250 according to the analysis.

The controller 220 receives user input information obtained through the sensor, from the electronic device 202. For example, the controller 220 may control the optical part 250 based on the received user input information (e.g., head gesture, hand gesture, and pupil movement information).

The memory 230 stores the command or the data received from or generated by one or more components (e.g., the controller 220, the memory 230, the output part 240, the optical part 250, the communication part 260, and the sensor 270) of the HMD 200.

The output part 240 outputs an analog audio signal fed from the controller 220. For example, the output part 240 may include a speaker, an earphone, a headset, and the like. The output part 240 may include a display for displaying various information (e.g., multimedia data or text data) to the user.

The optical part 250 magnifies the display screen of the electronic device 202 and adjusts a focus of the image.

The communication part 260 can connect by wire or wirelessly to the electronic device 202. The communication part 260 connects to the electronic device 202 using the communications or a USB.

The sensor 270 obtains the user's head tracking information. The sensor 270 tracks the head using a motion sensor including an acceleration sensor and a gyro sensor. The sensor 270 provides the obtained head tracking information to the controller 220.

The HMD 200 may further include an input part. For example, the input part may include a touchpad or a physical key button.

The names of the components of the HMD 200 may differ according to a type of the HMD 200. The HMD 200 may include one or more of the components, omit some components, or further include other components according to its type.

Figure 3:
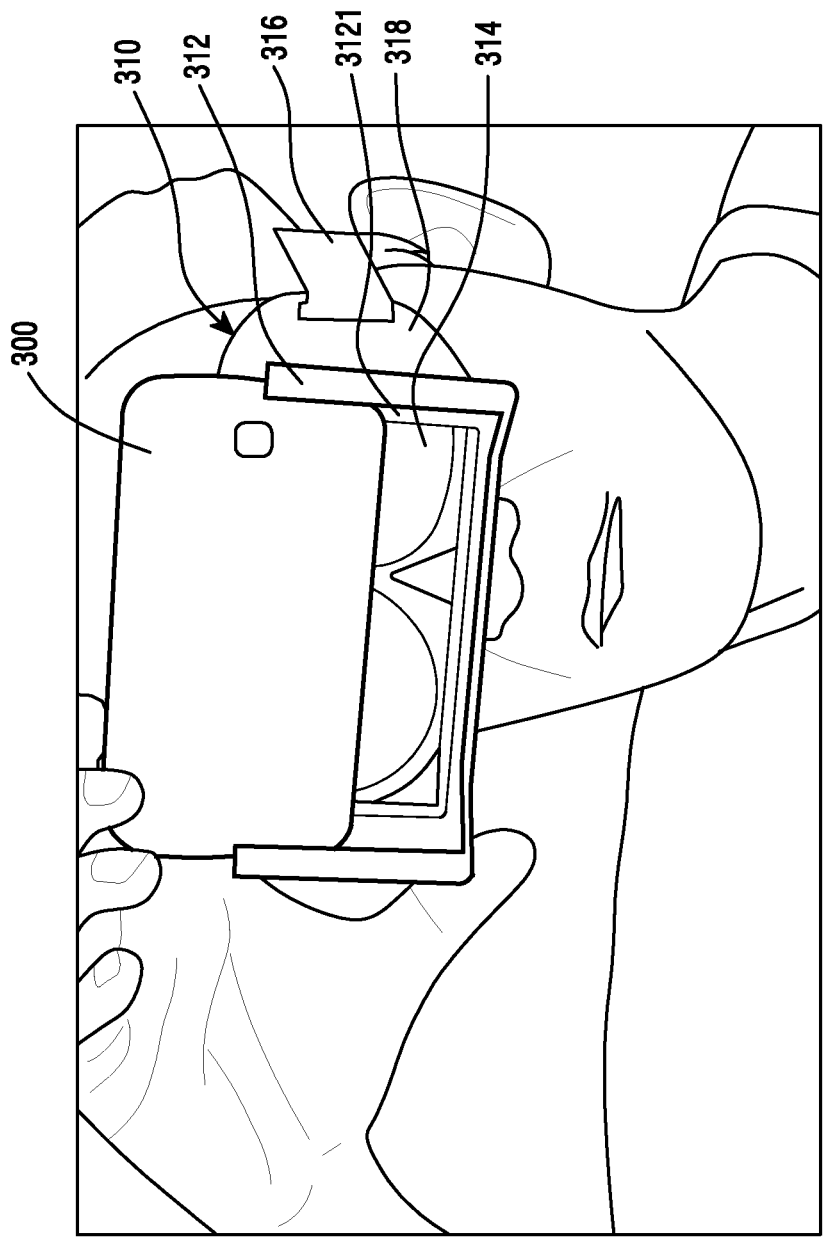
FIG. 3 illustrates an example for coupling an electronic device and an HMD according to an embodiment of the present disclosure.

FIG. 3 illustrates an example for coupling an electronic device and an HMD according to an embodiment of the present disclosure.

Referring to FIG. 3, the HMD 310 includes a docking portion 312 for coupling with the electronic device 300, an optical portion 314 for adjusting a display screen of the electronic device 300 coupled with the docking portion 312, a band portion 316 for attaching to the user's head, and a body portion 318 for interconnecting the docking portion 312, the optical portion 314, and the band portion 316.

The docking portion 312 is contacted and coupled with part of the electronic device 300. For example, referring to FIG. 3, the docking portion 312 includes a slide groove 3121 formed in a size corresponding to the electronic device 300. The electronic device 300 is received in the slide home 3121. The electronic device 300 can vertically slide and move in the slide home 3121 of the docking portion 312. For example, the user may mount the electronic device 300 to the docking portion 312 by pushing sides of the electronic device 300 toward the sliding home 3121. The electronic device 300 may, but is not limited to, slide and be received in the docking portion 312. For example, the electronic device 300 may be fixed to part of the docking portion 312. A connector of the electronic device 300 may be connected to the HMD 312 using the communication or the USB.

The optical portion 314 may include a lens, a barrel, and an aperture for displaying the display screen of the electronic device 300. For example, the optical portion 314 may divide the display screen of the electronic device 300 into two regions and show the regions in a two-dimensional or three-dimensional screen.

The band portion 316 may be formed with an elastic material such as rubber. The band portion 316 may be coupled with the user's head using a ring which is formed from an end part of the band portion 316.

The body portion 318 interconnects the docking portion 312, the optical portion 314, and the band portion 316 and balances the weight. The body portion 318 may include a touchpad and a physical key button for the input, and a speaker, an earphone, and a headset for the output. The body portion 318 may include a motion sensor for obtaining the user's head tracking information. The body portion 318 may further include a reflector. The reflector may include at least one mirror for leading the user input to the sensor of the electronic device 300. The reflector may not only lead the user input to the sensor of the electronic device 300 but also detect at least one of the marker information and the external environment information. For example, the reflector may be installed such that the sensor of the electronic device 300 can receive from the outside at least one of the head gesture, the hand gesture, the pupil movement, the depth information based on the distance to the object, the marker information, and the HMD mounting information.

Figure 4:
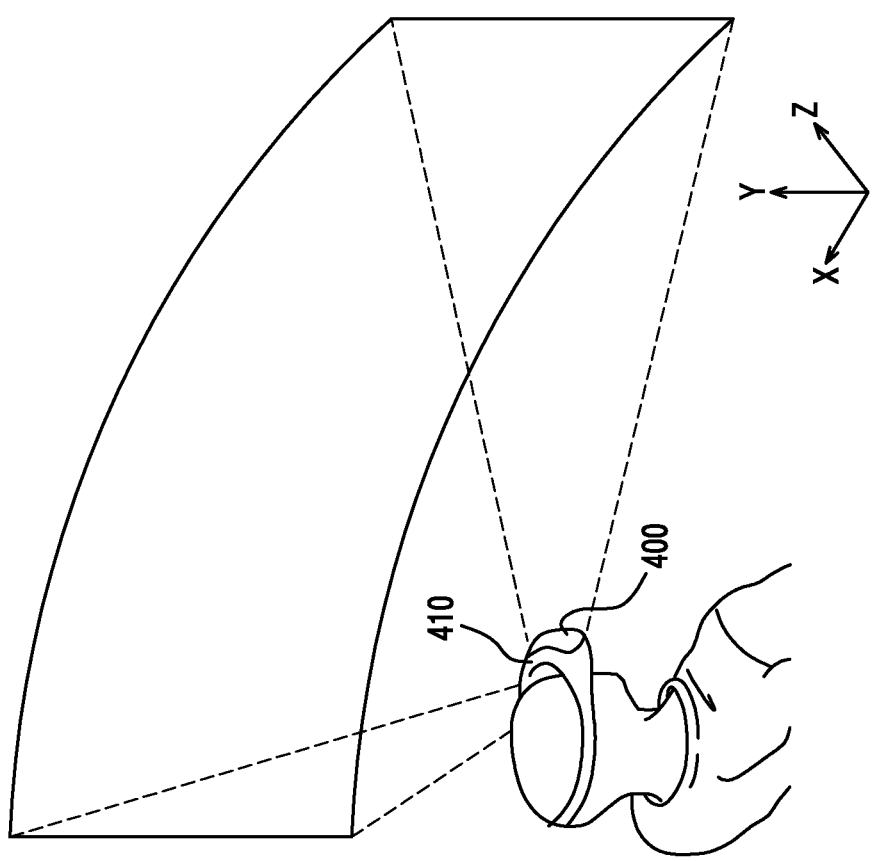
FIG. 4 illustrates an example of an electronic device and an HMD coupled together according to an embodiment of the present disclosure.

FIG. 4 illustrates an example of an electronic device and an HMD coupled together according to an embodiment of the present disclosure.

The HMD coupled with the electronic device may be implemented in various types. For example, an HMD 410 of FIG. 4 is of a goggle type and can accommodate an electronic device 400 to thus protect the electronic device 400 from the outside. The electronic device 400 contacts with at least part of the HMD 410.

Figure 5:
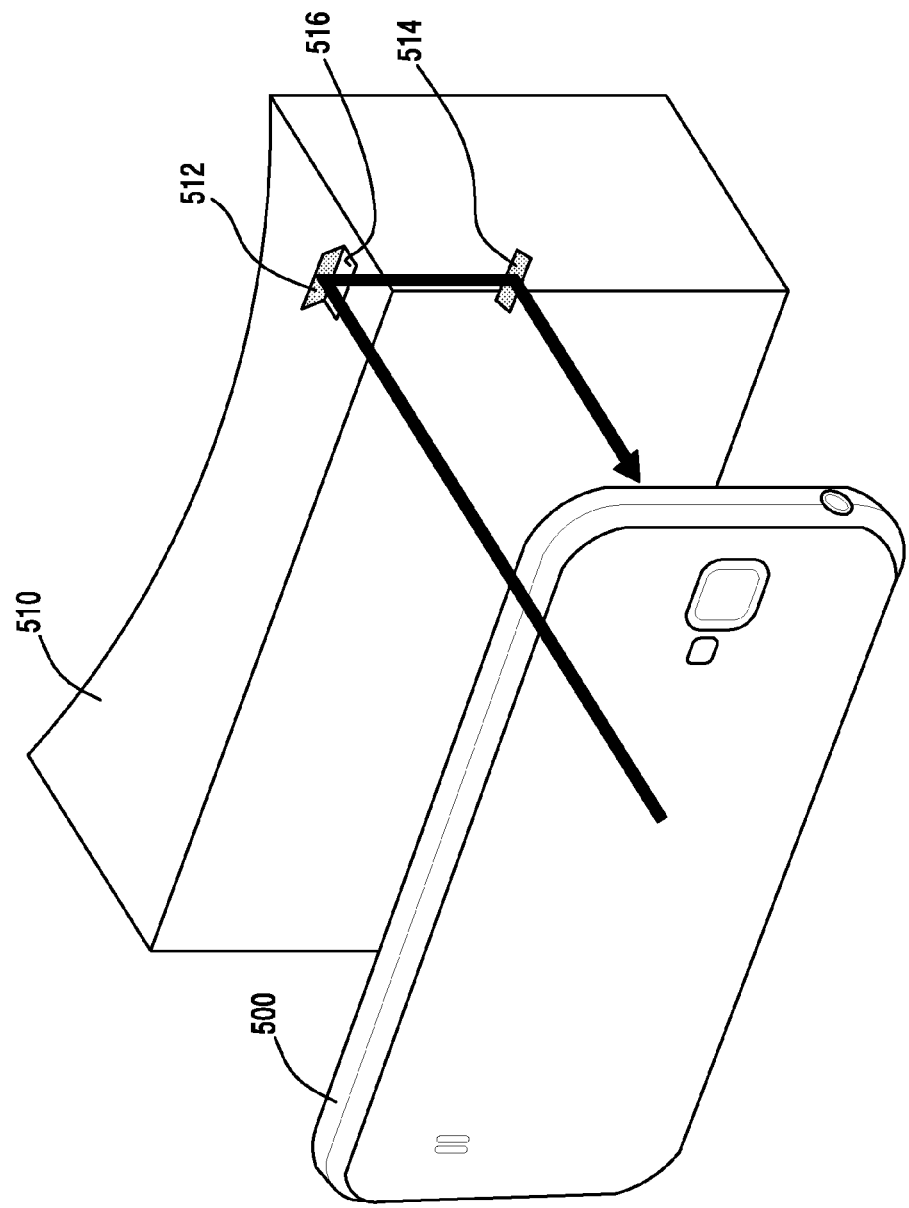
FIG. 5 illustrates an example for receiving an external input in an electronic device according to an embodiment of the present disclosure.

FIG. 5 depicts an example for receiving an external input in an electronic device according to an embodiment of the present disclosure.

Referring to FIG. 5, the electronic device 500 includes a plurality of sensors in its front side. Using the sensors, the electronic device 500 recognizes at least one of the marker, the external environment, and the user input.

The electronic device 500 captures an IM attached to an HMD 510 using an infrared camera, and obtains the marker information (e.g., an image signal) based on the captured IM. When coupling with the HMD 510, the electronic device 500 receives a user input (e.g., the head gesture, the hand gesture, the pupil movement) from the outside through the sensor installed in at least one of a front side and a back side thereof. The electronic device 500 recognizes the external environment through the sensor. For example, the electronic device 500 may obtain the depth information according to a distance to an external object from an image sensor installed in the front side or the back side, and track the position based on the obtained depth information. The HMD 510 adjusts a display screen of the electronic device 500 by tracking the position based on the depth information.

One or more mirrors 512 and 514 may be installed at particular locations of the HMD 510 to reflect the light from the outside. For example, referring to FIG. 5, the external light is reflected by the first mirror 512 installed at the particular location of the HMD 510, passes through a groove 516 of the HMD 510, and is led to the sensor of the electronic device 500 via the second mirror 514 installed at the location corresponding to the first mirror 512. The electronic device 500 recognizes at least one of the marker, the external environment, and the user input using the mirrors.

FIG. 6A illustrates an example of a mirror disposed in an HMD according to an embodiment of the present disclosure. The HMD includes a mirror for leading at least one of the marker, the external environment, and the user input from the outside, to a sensor of an electronic device as shown in FIG. 6A. The mirror faces the sensor of the electronic device, and a plurality of mirrors may be installed at a plurality of locations respectively. For example, the sensor of the electronic device detects at least one of the head gesture, the hand gesture, the pupil movement, the depth information based on the distance to the object, and the marker information through the mirror.

Figure 6B:
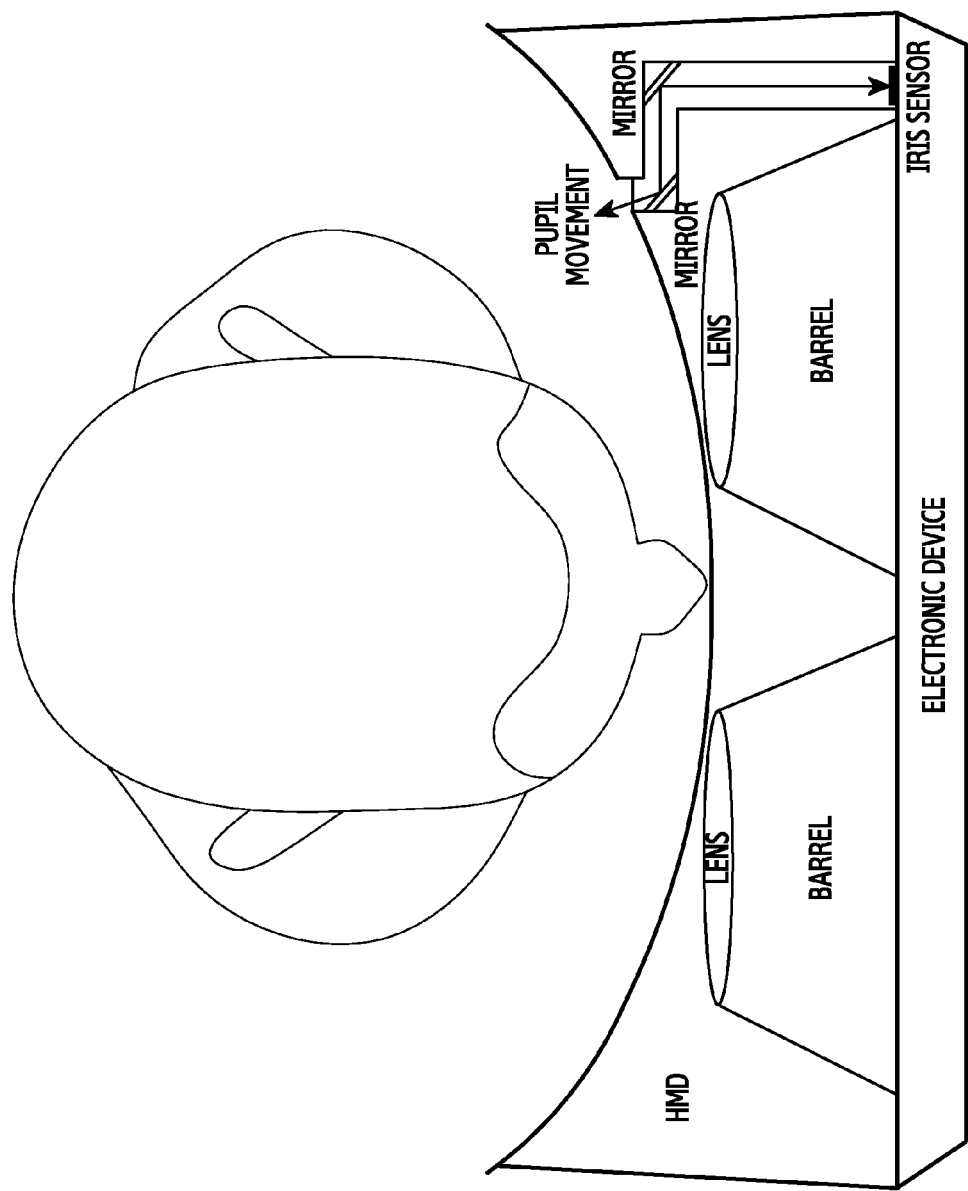
FIG. 6B illustrates another example of a mirror disposed in an HMD according to an embodiment of the present disclosure.

FIG. 6B illustrates another example of a mirror disposed in an HMD according to an embodiment of the present disclosure. The HMD includes mirrors for leading at least one of the marker, the external environment, and the user input from the outside, to a sensor of an electronic device as shown in FIG. 6B. For example, a plurality of mirrors is disposed in succession to face the sensor of the electronic device. The mirrors are disposed such that an iris sensor of the electronic device can detect the pupil movement of the user.

The disposition or arrangement of the mirror in the HMD is illustrated in FIGS. 5, 6A, and 6B, but it is not limited thereto. For example, the mirror may be disposed at any location of the HMD, and accordingly, the sensor of the electronic device can receive at least one of the marker, the external environment, and the user input from any one of the top side, the bottom side, the left side, and the right side of the HMD.

According an embodiment of the present disclosure, an electronic device may include a connector for connecting to an HMD and receiving an input through the HMD while the HMD is connected, and a processor for controlling to perform a function corresponding to the input.

The connector may include any one of a communication module for communicating with the HMD and a USB module.

The electronic device may include a sensor for receiving the input through the HMD, and the sensor may be a sensor of the electronic device or a sensor of the HMD.

The sensor of the electronic device may include at least one of an image sensor, an iris sensor, an infrared sensor, and a light sensor, and the sensor of the HMD may include at least one of an acceleration sensor and a gyro sensor.

The input may include at least one of a head gesture, a hand gesture, a pupil movement, depth information based on a distance to an object, marker information, and information about whether the HMD is mounted.

The HMD may include at least one mirror for leading the input to a sensor of the electronic device.

The mirror may be disposed inside the HMD to face the sensor of the electronic device.

A mounted device may include a docking portion for coupling with an electronic device, an optical portion for optically adjusting a display screen of the electronic device coupled to the docking portion and showing the adjusted display screen, and a reflector for leading an input so that a sensor of the electronic device coupled to the docking portion receives the input.

The reflector may include a mirror disposed inside the mounted device to face the sensor of the electronic device.

The sensor of the electronic device may include at least one of an image sensor, an iris sensor, an infrared sensor, and a light sensor, and the input may include at least one of a head gesture, a hand gesture, a pupil movement, depth information based on a distance to an object, marker information, and information about whether the mounted device is mounted.

Figure 7:
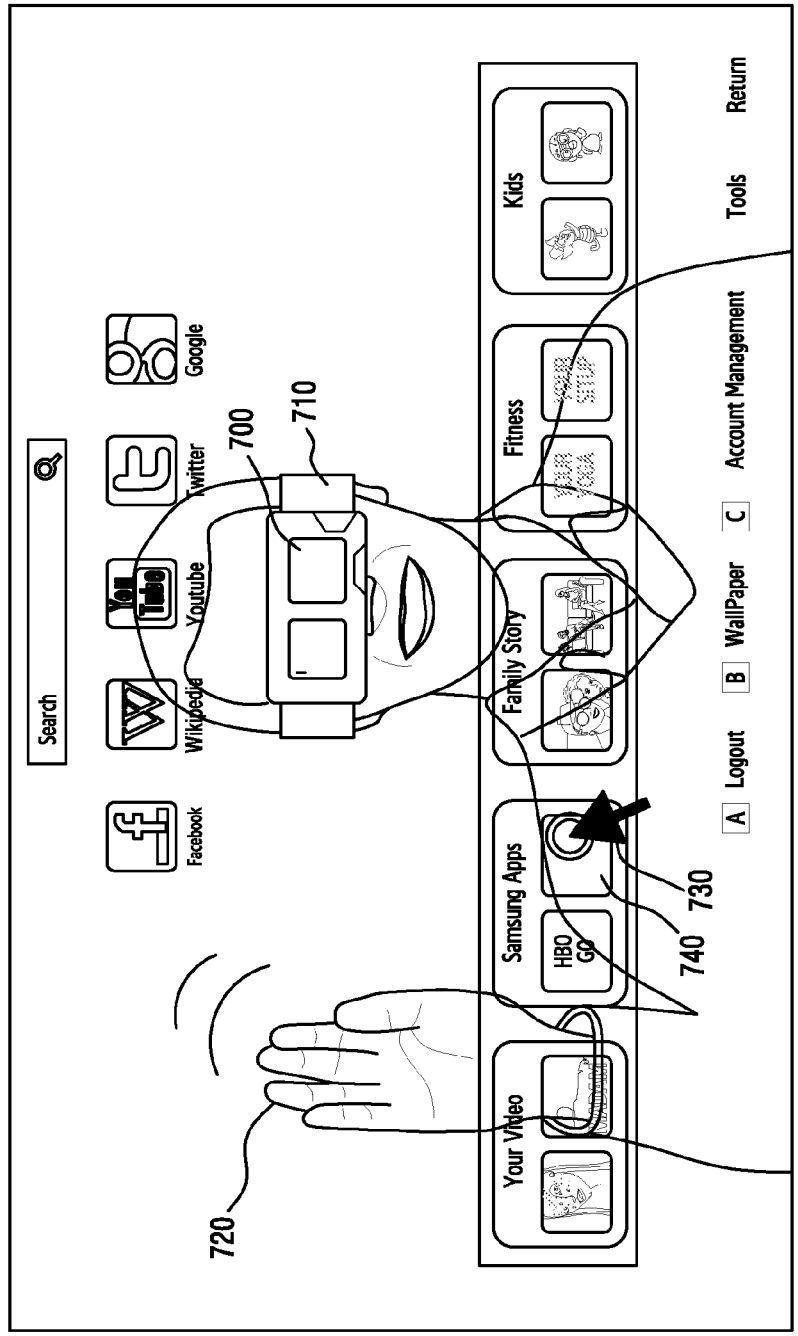
FIG. 7 illustrates an example of controlling based on an external input in an electronic device according to an embodiment of the present disclosure.

FIG. 7 illustrates an example of controlling based on an external input in an electronic device according to an embodiment of the present disclosure.

Referring to FIG. 7, an electronic device 700 is coupled with an HMD 710. When the user inputs a hand gesture 720 from a side of the electronic device 700, the electronic device 700 receives the hand gesture 720 through a mirror of the HMD 710. For example, using the hand gesture 720, the electronic device 700 controls a current screen based on the input of the hand gesture 720. The electronic device 700 may change a location of a pointer 730 according to the hand gesture 720. The electronic device 700 may select an icon 740 based on the hand gesture 720. Based on the hand gesture 720, the electronic device 700 may increase or decrease a magnification of a current image and switch the current image to a different image.

The electronic device 700 may execute a function associated with a current application based on the hand gesture 720. The electronic device 700 may control the connected HMD 710 based on the hand gesture 720. The function executed based on the hand gesture 720 varies.

In FIG. 7, the position tracking is conducted based on the hand gesture 720, but is not limited thereto. For example, the position may be tracked using the head gesture or the pupil movement. In FIG. 7, the hand gesture 720 is input from the side of the electronic device 700, but is not limited thereto. For example, the hand gesture 720 may be input above or below the electronic device 700.

Figure 8A:
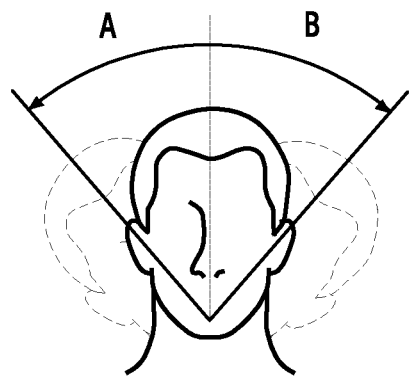
FIGS. 8A-8D illustrate examples of detecting a motion of an electronic device according to an embodiment of the present disclosure.
Figure 8B:
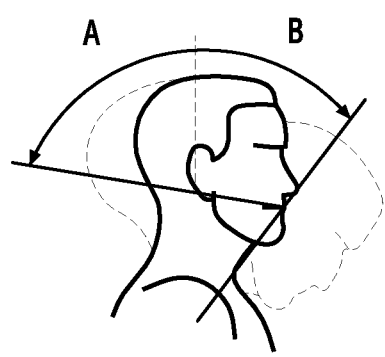
Figure 8C:
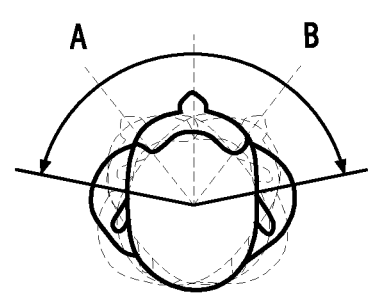
Figure 8D:
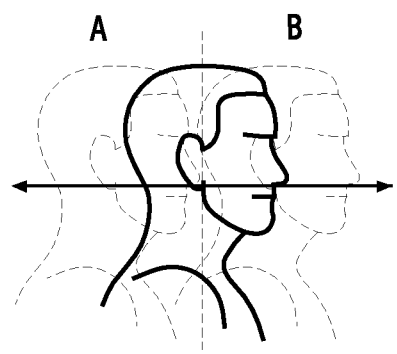

The electronic device 700 tracks the position by recognizing at least one of the marker and the external environment. For example, based on the depth information or the marker information obtained through the sensor, the electronic device 700 may detect an action of the user moving his/her head as shown in FIG. 8A, an action of moving the user's head backwards and forwards as shown in FIG. 8B, an action of changing a direction of the user's face to the sides as shown in FIG. 8C, and an action for changing the position of the user's face back and forth as shown in FIG. 8D. For example, when detecting that the user's body is tilted, the electronic device 700 may determine a motion of approaching the ground or a motion of moving forward. Upon determining the motion of approaching the ground or the motion of moving forward, the electronic device 700 may magnify and display the current image. In this case, the user may experience the approach toward an object on the screen according to the motion even in the virtual reality. The electronic device 700 may determine a motion receding from the ground and demagnify and display the current image. The electronic device 700 may adjust the magnification of the image to be displayed based on, but is not limited to, the distance information to the ground. The electronic device 700 may switch the current image to a different image based on at least one of the marker information and the external environment information recognized. For example, the electronic device 700 may control the magnification of the image to be displayed, using distance information to a particular building, height information to a ceiling, or height information of the object in the image. The electronic device 700 may determine the magnification of the image according to an acceleration change, a movement distance change, or an angular speed with respect to the detected motion.

Figure 9:
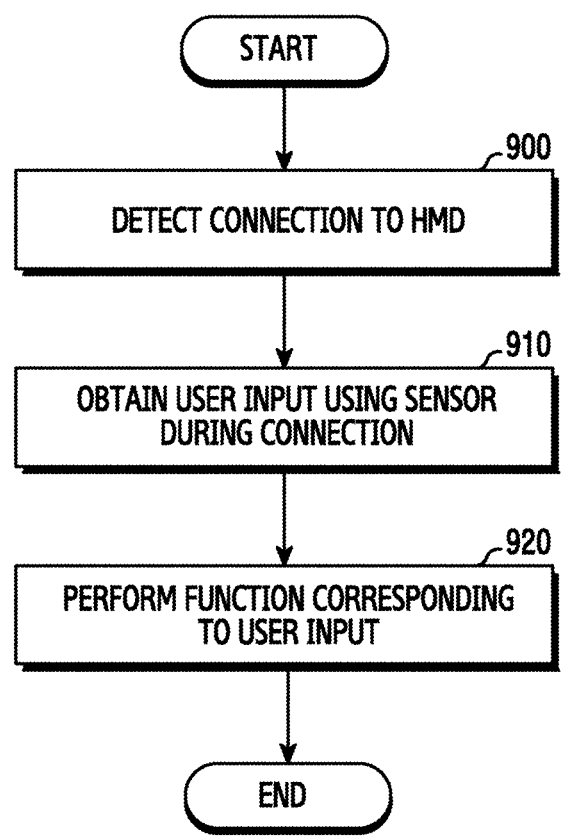
FIG. 9 illustrates a method for executing a function corresponding to a user input in an electronic device according to an embodiment of the present disclosure.

FIG. 9 illustrates a method for executing a function corresponding to a user input in an electronic device according to an embodiment of the present disclosure.

Referring to FIG. 9, the electronic device detects the connection to the HMD in operation 900. The electronic device may be connected to the HMD using the communication (e.g., communication system or network), the USB, or Polar Orbiting Geophysical Observatory (POGO).

In operation 910, the electronic device being connected obtains the user input using the sensor. The electronic device may obtain the user input using its sensor. For example, the electronic device may detect at least one of the head gesture, the hand gesture, the pupil movement, and the HMD mounting using at least one of an image sensor, an iris sensor, an infrared sensor, and a light sensor. The electronic device may obtain the user input using the sensor of the HMD. For example, the electronic device may obtain and provide the user's head tracking information using a motion sensor (or a six-axis sensor) of the HMD to the electronic device.

The electronic device may obtain the user input through a mirror disposed in the HMD. For example, the HMD may include the mirror for leading the user input from the outside to the sensor of the electronic device. The mirrors may be disposed to face the sensor of the electronic device, for example, at respective locations.

In operation 920, the electronic device performs the function corresponding to the user input. For example, the electronic device may track the position according to the user input. The electronic device may control a current content based on the user input. The electronic device may conduct a function associated with a current application based on the user input. The electronic device may control a current display screen based on the user input. The electronic device may control the connected HMD based on the user input. The present disclosure is not limited to those functions, and the function corresponding to the user input may vary.

Figure 10:
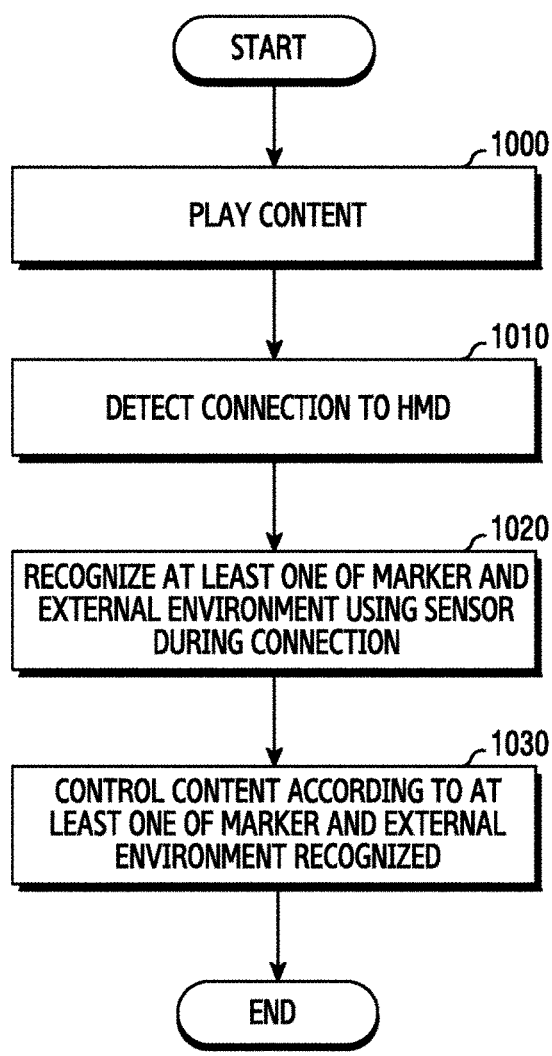
FIG. 10 illustrates a method for controlling a content executed based on at least one of a marker and an external environment in an electronic device according to an embodiment of the present disclosure.

FIG. 10 illustrates a method for controlling a content executed based on at least one of a marker and an external environment in an electronic device according to an embodiment of the present disclosure.

Referring to FIG. 10, in operation 1000, the electronic device executes content. The electronic device may execute the content before or after connecting to the HMD. For example, the content may include music, a game, a photo, a video, a document, a webpage, and so on.

In operation 1010, the electronic device detects the connection to the HMD. The electronic device may be connected to the HMD using the communication, the USB, or the POGO.

In operation 1020, the electronic device connected to the HMD recognizes at least one of the marker and the external environment using a sensor. For example, the electronic device may capture an IM using an infrared camera installed in one side. The electronic device may obtain position and posture information of an object by tracking and analyzing a position and a posture of the IM with respect to the infrared camera in real time, and track the position by analyzing the position and the type of the IM based on the obtained object position and posture information.

The electronic device may recognize the external environment using the sensor. For example, the electronic device may obtain the depth information based on a distance to an external object through the image sensor disposed in a front side or a back side. The electronic device may detect the action of the user moving his/her head as shown in FIG. 8A, the action of moving the user's head backwards and forwards as shown in FIG. 8B, the action of changing the direction of the user's face to the sides as shown in FIG. 8C, and the action for changing the position of the user's face back and forth as shown in FIG. 8D. For example, when detecting that the user's body is tilted, the electronic device may determine the motion of approaching the ground or the motion of moving forward and thus track the position.

In operation 1030, the electronic device controls the content according to at least one of the recognized marker and external environment. The electronic device may determine the motion of approaching the ground or the motion of moving forward and thus magnify and display the current image. In this case, the user may experience the approach toward the object on the screen according to the motion even in the virtual reality. The electronic device may determine the motion receding from the ground and demagnify and display the current image. The electronic device may adjust the magnification of the image to be displayed based on, but is not limited to, the distance information to the ground. The electronic device may switch the current image to a different image based on the recognized external environment information. For example, the electronic device may control the magnification of the image to be displayed, using the distance information to a particular building, the height information to the ceiling, or the height information of the object in the image. The electronic device may increase or decrease a volume of the content. The electronic device may increase or decrease a brightness of the content. The present disclosure is not limited to those functions, and the function for controlling the content may vary.

Figure 11:
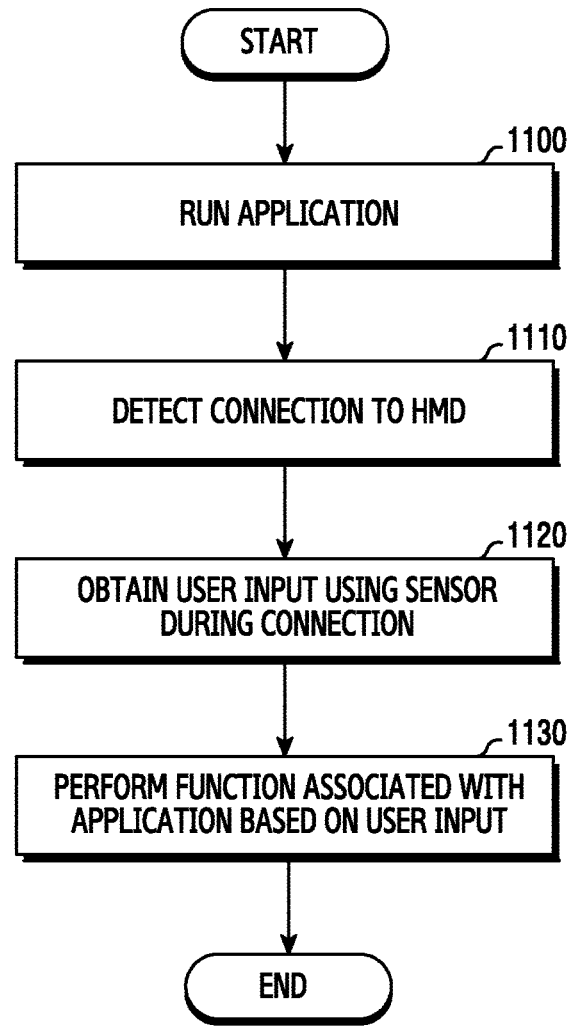
FIG. 11 illustrates a method for executing a function associated with a running application based on an user input in an electronic device according to an embodiment of the present disclosure.

FIG. 11 illustrates a method for executing a function associated with a running application based on a user input in an electronic device according to an embodiment of the present disclosure.

Referring to FIG. 11, in operation 1100, the electronic device executes an application. The electronic device may execute the application before or after coupling with the HMD. For example, the application may include at least one of an SMS/MMS application, an e-mail application, a Social Network Service (SNS) application, a game application, an educational application, a health care application, and a camera application.

In operation 1110, the electronic device detects the connection to the HMD. The electronic device may be connected to the HMD using the communication, the USB, or the POGO.

In operation 1120, the electronic device being connected obtains a user input using a sensor. The electronic device may obtain the user input using its sensor. For example, the electronic device may detect at least one of the head gesture, the hand gesture, the pupil movement, and the HMD mounting using at least one of an image sensor, an iris sensor, an infrared sensor, and a light sensor. The electronic device may obtain the user input using a sensor of the HMD. For example, the electronic device may obtain and provide the user's head tracking information using a motion sensor, to the electronic device.

The electronic device may obtain the user input through a mirror disposed in the HMD. For example, the HMD may include the mirror for leading the user input from the outside to the sensor of the electronic device. The mirror may be disposed to face the sensor of the electronic device, for example, at various locations.

In operation 1130, the electronic device performs a function associated with the running application based on the user input. When the camera application is executed, the electronic device may conduct, but is not limited to, functions such as photo shooting, video shooting, zoom-in or zoom-out, and camera option settings. When the message application is executed, the electronic device may conduct, but is not limited to, functions such as message sending, message deleting, message confirming, and message editing. The function associated with the application may vary.

According to an embodiment of the present disclosure, a method for operating an electronic device may include connecting to an HMD, receiving an input through the HMD while the HMD is connected, and performing a function corresponding to the input.

The connection may include any one of a communication connection and a USB connection to the HMD.

The electronic device may include a sensor for receiving the input through the HMD, and the sensor may be a sensor of the electronic device or a sensor of the HMD.

The sensor of the electronic device may include at least one of an image sensor, an iris sensor, an infrared sensor, and a light sensor, and the sensor of the HMD may include at least one of an acceleration sensor and a gyro sensor.

The input may include at least one of a head gesture, a hand gesture, a pupil movement, depth information based on a distance to an object, marker information, and information about whether the HMD is mounted.

The HMD may include at least one mirror for leading the input to a sensor of the electronic device.

The mirror may be disposed inside the HMD to face the sensor of the electronic device.

The function may include at least one of a function for controlling content, a function associated with an application, and a function for controlling a current screen.

A method for operating a mounted device may include coupling with an electronic device, and leading an input so that the coupled electronic device receives the input.

A mirror may be disposed to lead the input to a sensor of the electronic device.

Figure 12:
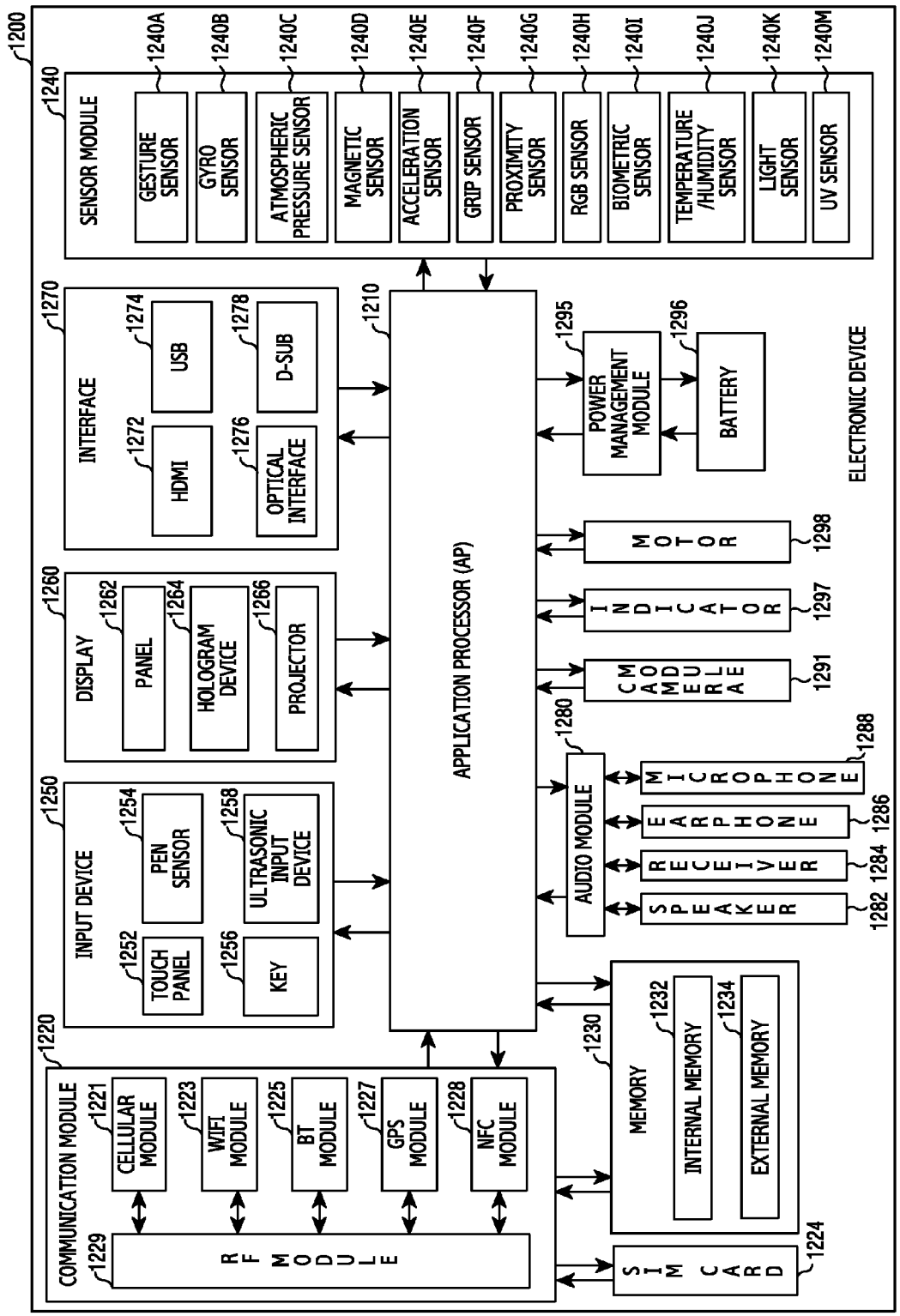
FIG. 12 illustrates a configuration of an electronic device according to an embodiment of the present disclosure.

FIG. 12 is a block diagram of an electronic device 1200 according to an embodiment of the present disclosure. The electronic device 1200 may include all or part of the electronic device 100 of FIG. 1.

Referring to FIG. 12, the electronic device 1200 includes one or more APs 1210, a communication module 1220, a SIM card 1224, a memory 1230, a sensor module 1240, an input device 1250, a display 1260, an interface 1270, an audio module 1280, a camera module 1291, a power management module 1295, a battery 1296, an indicator 1297, and a motor 1298.

The AP 1210 controls hardware or software components connected to the AP 1210 by driving an operating system or an application program, and processes various data and operations including multimedia data. For example, the AP 1210 may be implemented using an SoC. The AP 1210 may further include a Graphics Processing Unit (GPU).

The communication module 1220 transmits and receives data in a communication between the electronic device 1200 (e.g., the electronic device 100) and other electronic devices (e.g., the electronic device 104 or the server 106) connected over a network. For example, the communication module 1220 may include a cellular module 1221, a WiFi module 1223, a BT module 1225, a GPS module 1227, an NFC module 1228, and a Radio Frequency (RF) module 1229.

The cellular module 1221 provides voice telephony, video telephony, text messaging, and Internet service over the communication network (e.g., LTE, LTE-A, CDMA, WCDMA, UMTS, WiBro, or GSM). The cellular module 1221 identifies and authenticates an electronic device in the communication network using, for example, the SIM card 1224. The cellular module 1221 performs at least part of the functions of the AP 1210. The cellular module 1221 performs at least part of the multimedia control function.

The cellular module 1221 may include a CP. The cellular module 1221 may be implemented using, for example, an SoC. Although the components of the cellular module 1221 (e.g., the CP), the memory 1230, and the power management module 1295 are separated from the AP 1210 in FIG. 12, the AP 1210 may include at least part (e.g., the cellular module 1221) of those components.

The AP 1210 or the cellular module 1221 (e.g., the CP) loads and processes an instruction or data received from its non-volatile memory or at least one of the other components in a volatile memory. The AP 1210 or the cellular module 1221 stores data received from or generated by at least one of the other components in a non-volatile memory.

The WiFi module 1223, the BT module 1225, the GPS module 1227, and the NFC module 1228 each may include a processor for processing data transmitted and received via the corresponding module. Although the cellular module 1221, the WiFi module 1223, the BT module 1225, the GPS module 1227, and the NFC module 1228 are separated in FIG. 12, at least some (e.g., two or more) of the cellular module 1221, the WiFi module 1223, the BT module 1225, the GPS module 1227, and the NFC module 1228 may be included in a single IC or IC package. For example, at least some (e.g., the CP corresponding to the cellular module 1221 and a WiFi processor corresponding to the WiFi module 1223) of the processors corresponding to the cellular module 1221, the WiFi module 1223, the BT module 1225, the GPS module 1227, and the NFC module 1228 may be implemented using a single SoC.

The RF module 1229 transmits and receives data, for example, RF signals. The RF module 1229 may include a transceiver, a Pulse Amplitude-modulation Module (PAM), a frequency filter, or a Low Noise Amplifier (LNA). The RF module 1229 may further include a component, e.g., a conductor or a conducting wire, for sending and receiving electromagnetic waves in a free space in a wireless communication. Although the cellular module 1221, the WiFi module 1223, the BT module 1225, the GPS module 1227, and the NFC module 1228 share the single RF module 1229 in FIG. 12, at least one of the cellular module 1221, the WiFi module 1223, the BT module 1225, the GPS module 1227, and the NFC module 1228 may transmit and receive RF signals using a separate RF module.

The SIM card 1224 can be inserted into a slot formed at a certain location in the electronic device. The SIM card 1224 may include unique identification information (e.g., Integrated Circuit Card Identifier (ICCID)) or subscriber information (e.g., International Mobile Subscriber Identity (IMSI)).

The memory 1230 (e.g., the memory 130) may include an internal memory 1232 or an external memory 1234. The internal memory 1232 may include at least one of, for example, a volatile memory (e.g., DRAM, SRAM, SDRAM) and a non-volatile memory (e.g., OTPROM, PROM, EPROM, EEPROM, mask ROM, flash ROM, NAND flash memory, NOR flash memory).

The internal memory 1232 may employ an SSD. The external memory 1234 may further include a flash drive, for example, a CF memory card, an SD memory card, a Mini-SD memory card, an xD memory card, or a memory stick. The external memory 1234 may be functionally connected to the electronic device 1200 via various interfaces. The electronic device 1200 may further include a storage device (or a storage medium) such as a hard drive.

The sensor module 1240 measures a physical quantity or detects an operation status of the electronic device 1200, and converts the measured or detected information to an electrical signal. The sensor module 1240 may include at least one of, for example, a gesture sensor 1240A, a gyro sensor 1240B, an atmospheric pressure sensor 1240C, a magnetic sensor 1240D, an acceleration sensor 1240E, a grip sensor 1240F, a proximity sensor 1240G, a color sensor (e.g., a Red Green Blue (RGB) sensor) 1240H, a biometric sensor 1240I, a temperature/humidity sensor 1240J, a light sensor 1240K, and a UV light sensor 1240M. Alternatively, the sensor module 1240 may include an E-nose sensor, an EMG sensor, an EEG, an ECG sensor, an IR sensor, an iris sensor, or a fingerprint sensor. The sensor module 1240 may further include a control circuit for controlling the one or more sensors.

The input device 1250 may include a touch panel 1252, a (digital) pen sensor 1254, a key 1256, and an ultrasonic input device 1258. The touch panel 1252 recognizes a touch input using at least one of capacitive, resistive, infrared, and Surface Acoustic Wave (SAW) techniques. The touch panel 1252 may further include a control circuit. The capacitive touch panel recognizes not only a direct touch but also a proximity touch. The touch panel 1252 may further include a tactile layer. In this case, the touch panel 1252 provides a tactile response to the user.

The (digital) pen sensor 1254 may be implemented using the same or similar method to the user's touch input, or using a separate recognition sheet. The key 1256 may include, for example, a physical button, an optical key, or a keypad. The ultrasonic input device 1258, which obtains data by detecting a microwave signal through a microphone 1288 in the electronic device 1200, allows radio frequency identification through the pen which generates an ultrasonic signal. The electronic device 1200 may receive a user input from a connected external device (e.g., a network, a computer, or a server) using the communication module 1220.

The display 1260 may include a panel 1262, a hologram device 1264, and a projector 1266. The panel 1262 may employ a Liquid Crystal Display (LCD) or an Active Matrix Organic Light Emitting Diode (AMOLED) display. The panel 1262 may be implemented flexibly, transparently, or wearably. The panel 1262 may be constructed as a single module with the touch panel 1252. The hologram device 1264 presents a three-dimensional image in the air using the interference of light. The projector 1266 displays an image by projecting light onto a screen. The screen may be internal or external to the electronic device 1200. The display 1260 may further include a control circuit for controlling the panel 1262, the hologram device 1264, or the projector 1266.

The interface 1270 may include, for example, an HDMI 1272, a USB 1274 connector, an optical interface 1276, and a D-sub 1278 connector. The interface 1270 may be included in, for example, the communication interface 160 of FIG. 1. Alternatively, the interface 1270 may include, for example, a Mobile High-Definition Link (MHL), an SD/MultiMediaCard (MMC) interface, or an Infrared Data Association (IrDA) interface.

The audio module 1280 converts a sound to an electrical signal and vice versa. For example, the audio module 1280 may process sound information input and output through a speaker 1282, a receiver 1284, an earphone 1286, or the microphone 1288.

The camera module 1291 may captures a still picture and a moving picture. For example, the camera module 1291 may include one or more image sensors (e.g., a front sensor or a rear sensor), a lens, an Image Signal Processor (ISP), or a flash (e.g., an Light Emitting Diode (LED) or a xenon lamp).

The power management module 1295 manages power of the electronic device 1200. For example, the power management module 1295 may include a Power Management IC (PMIC), a charger IC, a battery, or a battery gauge. For example, the PMIC may be mounted in an IC or an SoC semiconductor.

The charging type may be divided to a wired type and a wireless type. The charger IC may charges the battery and prevents overvoltage or overcurrent from flowing from a charger. For example, the charger IC may include a charger IC for at least one of the wired charging type or the wireless charging type. For example, the wireless charging type may include magnetic resonance, magnetic induction, and microwave, and may further include an additional circuit such as a coil loop, a resonance circuit, and a rectifier circuit for the wireless charging.

The battery gauge measures, for example, the remaining capacity of the battery 1296 and the voltage, the current, or the temperature of the charging. The battery 1296 stores or produces electricity and supplies the power to the electronic device 1200 using the stored or produced electricity. For example, the battery 1296 may be a rechargeable battery or a solar battery.

The indicator 1297 displays a certain status, for example, a booting state, a message state, or a charging state of the electronic device 1200 or part (e.g., the AP 1210) of the electronic device 1200. The motor 1298 converts an electrical signal to a mechanical vibration. The electronic device 1200 may include a processor (e.g., the GPU) for supporting mobile TV. For example, the processor for supporting mobile TV may process media data in conformity with a Digital Multimedia Broadcasting (DMB), a Digital Video Broadcasting (DVB), or a media flow standard.

The aforementioned components of the electronic device may include one or more parts, and the name of the corresponding component may differ according to the type of the electronic device. The electronic device of the present disclosure may include at least one of the components, omit some components, or further include other components. Some of the electronic device components may be combined into a single entity to carry out the same functions of the corresponding components.

At least part of the device (e.g., the modules or the functions) or the method (e.g., the operations) described in the appended claims and/or the specifications of the present disclosure may be implemented using, for example, instructions stored as the programming module in a non-transitory computer-readable storage medium. For example, when an instruction is executed by one or more processors (e.g., the processor 120), the one or more processors perform the corresponding function. The non-transitory computer-readable storage medium may be, for example, the memory 130. At least part of the programming module may be implemented (e.g., executed) by the processor 120. At least part of the programming module may include, for example, a module, a program, sets of instructions, or a process for performing one or more functions.

The non-transitory computer-readable recording medium may include magnetic media such as a hard disk, a floppy disk and a magnetic tape, an optical media such as a Compact Disc ROM (CD-ROM) and a Digital Versatile Disc (DVD), magneto-optical media such as a floptical disk, and hardware devices specifically configured to store and execute an application instruction (e.g., the programming module) such as an ROM, a Random Access Memory (RAM), and a flash memory. A program instruction may include not only the machine code made by a compiler but also the high-level language code executable by a computer using an interpreter. The above-stated electronic device may serve as one or more software modules for fulfilling the operations of an embodiment of the present disclosure, and vice versa.

The module or the programming module according to an embodiment of the present disclosure may include at least one of the aforementioned components, omit some components, or further include other components. The operations fulfilled by the modules, the programming modules, or other components may be carried out in sequence, in parallel, repeatedly, or heuristically. In addition, some operations may be executed in a different order or omitted, or other operations can be added.

In a recording medium storing the instructions, the instructions, when executed by at least one processor, control the at least one processor to conduct at least one operation. The at least one operation may include connecting to the HMD, receiving an input through the HMD during the connection to the HMD, and performing a function corresponding to the input.

As set forth above, the function controlling method and the electronic device thereof can reduce the vibration according to the user input while the HMD is mounted, and enhance usability in a specific situation, for example, when the HMD is mounted. The function controlling method and the electronic device thereof can perform the function corresponding to the user input with the mounted HMD. The function controlling method and the electronic device thereof can provide the usability for intuitively controlling the device without having to press a control button with the mounted HMD. The function controlling method and the electronic device thereof can fulfill the position tracking by recognizing at least one of the marker and the external environment without a separate additional module. When the HMD is used, the function controlling method and the electronic device thereof can prevent dizziness of a user according to the motion and efficiently utilize battery power of the HMD.

While the disclosure has been shown and described with reference to certain embodiments thereof, it will be understood by those skilled in the art that various changes in form and details may be made therein without departing from the spirit and scope of the disclosure as defined by the appended claims and their equivalents.

What is claimed is:

1. A method for operating an electronic device, the method comprising:
 connecting to a Head Mounted Device (HMD);
 receiving an input using at least one sensor which is disposed on a front surface of the electronic device while the electronic device is connected to the HMD, the front surface facing a face of a user of the HMD, wherein the input comprises at least one of a hand gesture, a pupil movement and depth information and is provided from the least one sensor which receives the input through at least one mirror disposed in the HMD, and wherein the electronic device includes a display disposed on the front surface of the electronic device; and
 in response to the received input, performing a function corresponding to the received input.

2. The method of claim 1, wherein connecting to the HMD comprises connecting to the HMD through one of a communication connection and a Universal Serial Bus (USB) connection.

3. The method of claim 1, wherein the HMD comprises at least one sensor for receiving the input.

4. The method of claim 3, wherein the at least one sensor disposed on the front surface of the electronic device comprises at least one of an image sensor, an iris sensor, an infrared sensor, and a light sensor, and
 wherein the HMD further comprises at least one of an acceleration sensor and a gyro sensor.

5. The method of claim 1, wherein the input further comprises a head gesture and at least one of the head gesture, the hand gesture, the pupil movement and the depth information is based on a distance to an object, marker information, and information about whether the HMD is mounted.

6. The method of claim 1, wherein the at least one mirror is disposed inside the HMD to face the sensor of the electronic device.

7. The method of claim 1, wherein the function corresponding to the received input comprises at least one of a function for controlling an image displayed on a display screen of the electronic device, a function associated with an application, and a function for controlling the display screen.

8. An electronic device comprising:
a connector configured to connect to a Head Mounted Device (HMD);
at least one sensor which is disposed on a front surface of the electronic device, the front surface facing a face of a user of the HMD;
a display which is disposed on the front surface of the electronic device; and
a processor configured to:
receive an input using the at least one sensor while the electronic device is connected to the HMD, wherein the input comprises at least one of a hand gesture, a pupil movement and depth information and is provided from the least one sensor which receives the input through at least one mirror disposed in the HMD; and
perform a function corresponding to the received input in response to the received input.

9. The electronic device of claim 8, wherein the connector comprises one of a communication module for communicating with the HMD and a Universal Serial Bus (USB) module.

10. The electronic device of claim 8, wherein the HMD comprises at least one sensor for receiving the input.

11. The electronic device of claim 10, wherein the at least one sensor of the electronic device comprises at least one of an image sensor, an iris sensor, an infrared sensor, and a light sensor, and
wherein the HMD further comprises at least one of an acceleration sensor and a gyro sensor.

12. The electronic device of claim 8, wherein the input further comprises a head gesture and at least one of the head gesture, the hand gesture, the pupil movement and the depth information is based on a distance to an object, marker information, and information about whether the HMD is mounted.

13. The electronic device of claim 8, wherein the at least one mirror is disposed inside the HMD to face the sensor of the electronic device.

14. A mounted device comprising:
a docking portion configured to couple with an electronic device;
an optical portion configured to optically adjust a display screen of the electronic device coupled to the docking portion and to show the adjusted display screen; and
a reflector configured to provide an input comprising at least one of a hand gesture, a pupil movement and depth information to at least one sensor which is disposed on a front surface of the electronic device, the front surface facing a face of a user of the mounted device,
wherein the electronic device includes a display disposed on the front surface of the electronic device.

15. The mounted device of claim 14, wherein the reflector comprises at least one mirror disposed inside the mounted device to face the sensor of the electronic device.

16. The mounted device of claim 14, wherein the sensor of the electronic device comprises at least one of an image sensor, an iris sensor, an infrared sensor, and a light sensor, and
wherein the input further comprises a head gesture and at least one of the head gesture, the hand gesture, the pupil movement and the depth information is based on a distance to an object, marker information, and information about whether the mounted device is mounted.

17. A method for operating a mounted device, the method comprising:
coupling with an electronic device; and
providing, by a reflector, an input comprising at least one of a hand gesture, a pupil movement and depth information, to at least one sensor which is disposed on a front surface of the electronic device, the front surface facing a face of a user of the mounted device,
wherein the electronic device includes a display disposed on the front surface of the electronic device.

* * * * *